United States Patent
Joynt

(10) Patent No.: US 8,171,660 B2
(45) Date of Patent: May 8, 2012

(54) DECAL PROTECTOR AND PROTECTION METHOD

(76) Inventor: Ronald M. Joynt, Kingston, IL (US)

( * ) Notice: Subject to any disclaimer, the term of this patent is extended or adjusted under 35 U.S.C. 154(b) by 695 days.

(21) Appl. No.: 12/272,230

(22) Filed: Nov. 17, 2008

(65) Prior Publication Data

US 2009/0068392 A1  Mar. 12, 2009

(51) Int. Cl.
*G09F 21/04* (2006.01)
(52) U.S. Cl. ............... 40/590; 40/591; 40/661
(58) Field of Classification Search ............ 40/590, 40/591, 661, 209, 606.12, 611.1, 772
See application file for complete search history.

(56) References Cited

U.S. PATENT DOCUMENTS

| | | | | |
|---|---|---|---|---|
| 3,187,452 A * | 6/1965 | Dotson | ........................... | 40/202 |
| 4,077,145 A * | 3/1978 | Smoczynski | ................... | 40/590 |
| 4,190,691 A * | 2/1980 | Kramer | .......................... | 428/67 |
| 4,545,140 A * | 10/1985 | Winston | .......................... | 40/661 |
| 5,148,618 A * | 9/1992 | Brewster | ........................ | 40/626 |
| 5,401,079 A * | 3/1995 | Rooney | ........................ | 301/6.91 |
| 5,819,449 A * | 10/1998 | Molson | ........................... | 40/200 |
| 6,860,045 B1* | 3/2005 | Sadler et al. | ..................... | 40/1.5 |
| 7,174,665 B2* | 2/2007 | Jay | ............................. | 40/611.01 |
| 7,383,649 B2* | 6/2008 | MacNeil | ........................ | 40/200 |
| 7,637,339 B2* | 12/2009 | Suzuki | ......................... | 180/219 |
| 7,748,150 B2* | 7/2010 | Chuang | .......................... | 40/590 |
| 2002/0152659 A1* | 10/2002 | Hartill | ............................ | 40/661 |
| 2006/0277803 A1* | 12/2006 | Cotta et al. | ...................... | 40/209 |
| 2007/0089337 A1* | 4/2007 | Van Kehrberg | ................ | 40/591 |
| 2007/0119083 A1* | 5/2007 | Diller | ............................. | 40/661 |
| 2009/0091229 A1* | 4/2009 | Karl et al. | ................. | 312/351.1 |

* cited by examiner

*Primary Examiner* — Joanne Silbermann
*Assistant Examiner* — Christopher E Veraa
(74) *Attorney, Agent, or Firm* — Reinhart Boerner Van Deuren P.C.

(57) ABSTRACT

A decal plate assembly for a motocross motorcycle includes an underlying base plate such as a number plate that is mounted to the vehicle. A decal having printed indicia thereon is attached to the base plate via adhesive or being integrally molded into the base plate. Additionally, the transparent cover plate at least partially covers a portion of the decal and the underlying base plate to prevent wear of the decal. This is particular applicable to high wear regions such as in the boot area of the motocross motorcycle where decals are typically subject to high wear.

11 Claims, 4 Drawing Sheets

DECAL PROTECTOR AND PROTECTION METHOD

FIELD OF THE INVENTION

The present invention generally relates to decals and more particularly relates to the protection of decals from wear such as may be used, for example, in the motocross industry where decals are applied to different external portions of a motocross motorcycle.

BACKGROUND OF THE INVENTION

In the motocross industry and other racing industries, decals are used for a variety of purposes. For example, decals may be used to convey branding information, sponsor information and information about the rider to often include numbers that identify the rider of the motorcycle. The decals typically cover plastic plates or, alternatively, metal plates that are arranged all over the motorcycle. Typically the decals comprise of vinyl support sheet with an adhesive layer thereon that provides for adhesive attachment of the decal to a plate of the motorcycle. Such decals may also be integrally molded into the plastic plate and thereby integrally attached to the underlying plate. Decals may be made from a variety of materials to include paper or other such material, but typically in the motocross industry such decals are made of vinyl or other similar material with an adhesive layer on one side and printed indicia to include graphics and/or a number or lettering on the other side opposite the adhesive.

Given that motocross is a fairly intense sport as are other racing sports, motocross motorcycles undergo a certain amount of wear and tear which can occur due to dropping the bike or for other reasons such as the rider rubbing up against the decal plates. This can, unfortunately, cause premature destruction and require replacement of decals on the plates which is undesirable. For example, one well-known wear location is in the boot region where a rider's boot tends to wear in the number plate and/or air box in a region just above the foot rest on the motorcycle. Thus, the desire to have graphics and information on the bike is not easily reconciled with the high wear environment in which the motor bike operates.

The invention provides an advancement over the state of the art.

BRIEF SUMMARY OF THE INVENTION

The present invention is directed in part toward a transparent cover plate that at least partially covers a decal on a vehicle such as a motocross bike to prevent premature wear and replacement of such a decal or to otherwise provide for increased life-span as to the aesthetic appearance of decals and graphics contained thereon.

According to one aspect, a decal plate for a vehicle comprises a base plate configured for mounting to the vehicle. A transparent cover plate at least partially covers at least a portion of the base plate. A decal having printed indicia thereon is interposed between the base plate and the transparent cover plate. For example, in this regard the decal may be any conventional decal provided such as an adhesive label or, alternatively, a label that is integrally molded into the underlying base plate. In either instance, the decal is interposed between the base plate and the transparent cover plate where it can be visually seen.

Preferably the base plate and the transparent cover plate are molded plastic plates sharing a common contoured shape such that the contours on the base plate and the cover plate cause the plates to mate in substantially complete surface-to-surface contact. The contoured shape may be sized and configured to cover a portion of a motocross motorcycle. This may be particularly applied to high wear regions such as most notably the number plate and/or air box on the sides of the motorcycle in a region right above the foot rest. In this high wear region, the decal often will co-act and engage with the boot of the rider due to the maneuvering of the rider on a motor bike during a ride.

Another aspect is that the cover plate may also include corresponding bolt holes to those of the underlying base plate such that at least one aligned bolt hole formed through the cover plate aligns with a hole formed through the base plate such that the bolt which attaches the base plate to the vehicle also attaches the cover plate to the vehicle. Additional or alternative attachment means may be provided such as molded snaps on the transparent cover plate and/or a side periphery that tightly engages in the outer periphery of the underlying base plate.

According to some embodiments, the transparent cover plate only partially covers the underlying base plate, and according to other embodiments, the cover plate may fully cover the underlying base plate.

Another aspect of the present invention is an apparatus for protecting a decal that is disposed on a decal plate in which the decal plate is contoured with a contoured surface to conform to the dimensions of a motocross motorcycle. The apparatus comprises a transparent cover plate molded of plastic material that is sized and configured to at least partially cover the decal. The transparent cover plate has a contoured plate body substantially matching the contoured surface of the decal plate such that the transparent cover plate is adapted to mate in substantial surface-to-surface relation with the decal plate.

Preferably, the cover plate includes a sidewall depending from the contoured plate body that is adapted to closely surround a periphery of the decal plate.

Yet another aspect of the present invention is directed toward a method of protecting decals on a motocross motorcycle comprising protecting at least a portion of the decal with a transparent cover plate and mounting the transparent cover plate to the motocross motorcycle.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
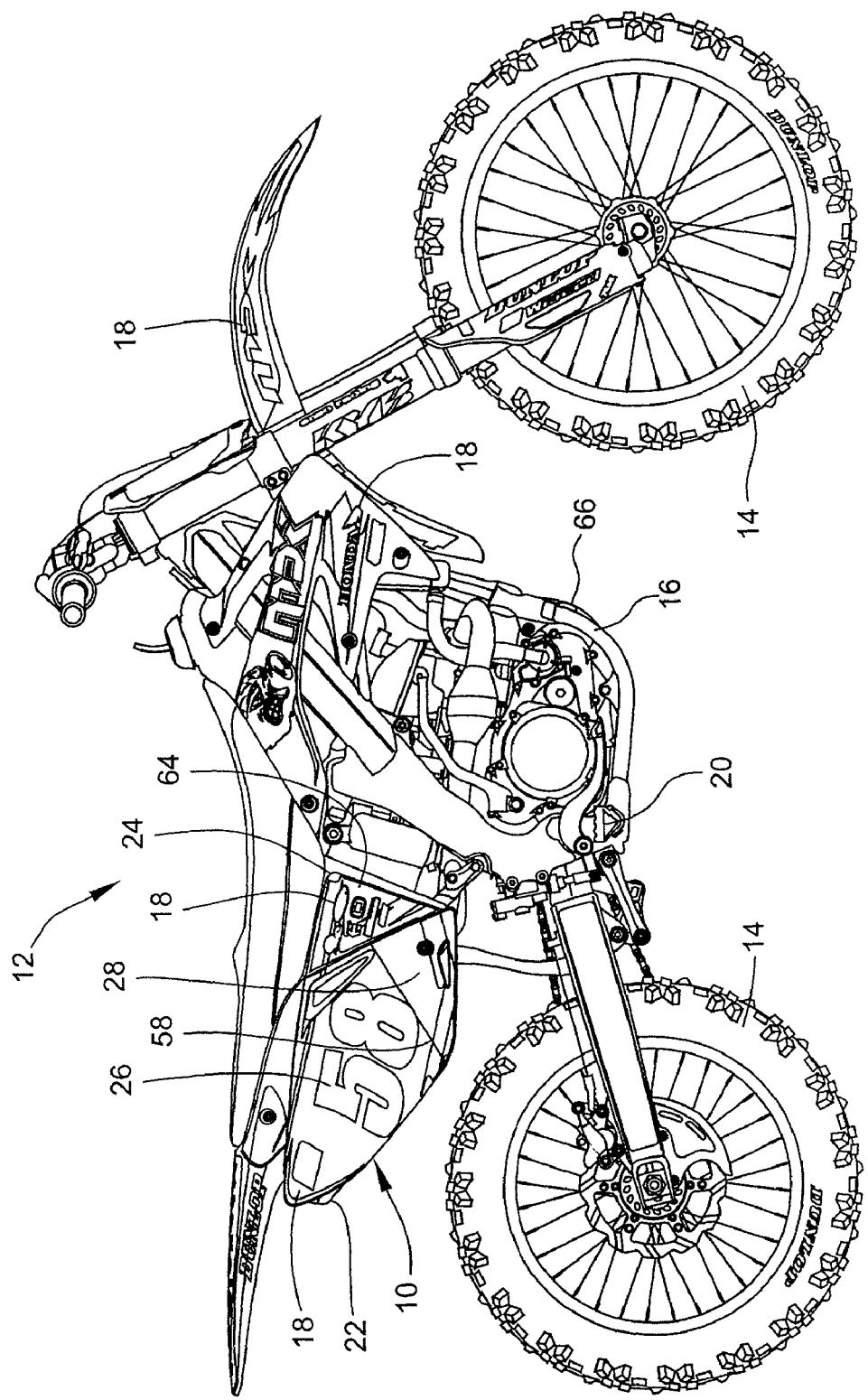
FIG. 1 is a side view of a motocross motorcycle employing a decal plate assembly according to an embodiment of the present invention.

In accordance with an embodiment of the present invention, FIG. 1 illustrates a decal plate assembly 10 on a vehicle which in this embodiment is a motocross motorcycle or "motor bike" 12 for short. As shown therein, the motor bike 12 includes wheels 14 rotatably mounted relative to a frame 16 and a plurality of decal base plates 18 to include a rad cover, a front fender, a rear fender, lower fork legs, air box, arched front fender and swing arm. The base plates 18 typically cover a portion of the motor bike and/or act as guards such as the fenders which limit debris spray. Also mounted on the frame are foot pegs 20 where a rider's feet may be placed upon during a ride.

One particular decal base plate 18 is often referred in the art as a number plate 22; and another base plate 18 is known as an air box plate 24 (sometimes simply "air box"). It is in this region of the number plate 22 and air box plate 24 where a rider's boots tend to scrape and rub against decals 26 that are located in this region. Specifically, many or all of the decal base plates 18 are typically covered with decals 26 to provide for branding information, marketing and sponsorship information, and information about the rider such as a number. In the case of the number plate 22, the decal 26 therefore typically includes printed indicia such as a number indicative of the driver as well as graphics such as stripes for aesthetics.

In accordance with the embodiment, the decal plate assembly 10 includes the underlying base plate indicated as number plate 22, a decal 26 and a transparent cover plate 28 that is arranged to protect and cover the decal 26 in the region of high wear, which in this case is the boot region in the area above the foot peg 20.

Figure 2:
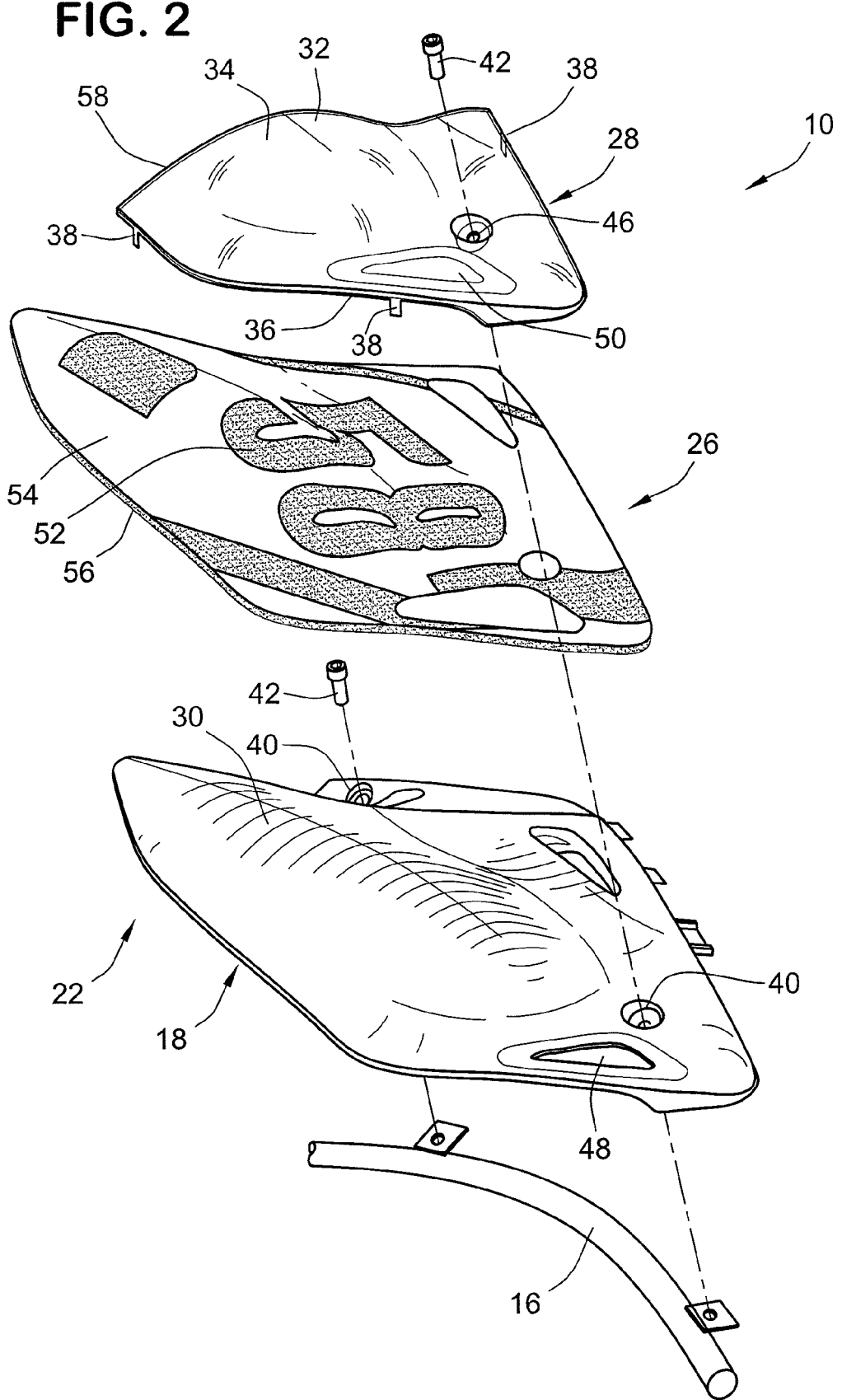
FIG. 2 is an exploded assembly view of the decal plate assembly employed in FIG. 1.

Referring to the decal plate assembly 10 in greater detail and with reference to FIG. 2, it is seen that the decal plate assembly 10 is shown to include an opaque number plate 22, a decal 26 in the form of an adhesive label, and the transparent cover plate 28. In this embodiment, the cover plate 28 only partially covers a front portion of the number plate 22 in the region where it is subject to wear due to a rider's boot. The number plate 22 is a molded plastic structure made from plastic material that typically has no printed indicia thereon. The number plate 22 is molded to be contoured in shape with a contoured surface 30 that supports the decal 26. The decal 26 may be either adhesively attached as illustrated or alternatively molded directly into the plastic material of the number plate during molding operation. The transparent cover plate 28 is also molded of plastic material, but unlike the underlying number plate 22 which is typically opaque, the transparent cover plate 28 is molded of a transparent plastic material so that one can readily view the decal 26 that is either fully or partially covered by the transparent cover plate 28. Transparent cover plate 28 may be molded by plastic injection molding techniques or molded via vacuum forming to be contoured with a contoured surface 32 along the contoured plate body 34 thereof. The contour of the cover plate 28 is substantially matched to the contoured surface 30 of the underlying number plate such that the transparent cover plate is adapted to mate in substantial surface-to-surface relation with the underlying decal plate.

Preferably, the cover plate 28 also includes a sidewall 36 that depends from the contoured plate body 34. The sidewall 36 is adapted to closely surround a periphery of the decal plate. The sidewall 36 may snuggly fit and thereby help attach the cover plate to the underlying number plate and/or carry snap-on structure 38 that can attach the cover plate 28 to the underlying number plate by engaging the reverse side of the number plate. However, it should be appreciated that these features are optional and that the cover plate may merely be attached by bolt on attachment as described in the next paragraph.

In this regard, it is seen that the number plate 22 typically includes one or more bolt holes 40 that receive bolts 42 that facilitate bolt-on attachment of the number plate 22 to the frame 16 of the motor bike 12 (a portion of a frame 16 is also depicted in FIG. 2). The bolt holes 40 may be reinforced in part by a metal reinforcement ring 44 that may be integrally molded into the plastic material of the number plate 22 to provide for reinforcement and strength in the bolt-on attachment region.

The transparent cover plate 28 also includes at least one aligned bolt hole 46 that is diametrically aligned with the corresponding bolt hole 40 of the underlying number plate 22 when the cover plate and number plate are arranged in mating surface-to-surface contact. As a result, the bolt 42 that can secure the number plate 22 to the frame 16 can also secure the transparent cover plate 28 to the number plate 22, and retain it there in substantially complete surface-to-surface contact. Other features of the cover plate and the base plate can be common such as having vent holes 48, 50 that are commonly formed at the same relative locations in the cover plate and number plate. The bolt-on attachment also allows the cover plate to be removable from the base plate thereby allowing a replacement and/or updating of the decal as may be desired. As shown, the decal 26 has printed indicia that is formed and created on a base sheet 54 of suitable material such as vinyl (or alternatively paper material or other substrate sheet material). On the other side opposite the printed indicia 52, the base sheet 54 may include an adhesive layer 56 to facilitate adhesive attachment to the underlying decal plate.

As shown in the embodiment of FIGS. 1 and 2, the cover plate 28 may only partially cover a high wear region of the underlying base plate. For example, in the case of the number plate illustrated, the number plate includes a top end, a rear end, a bottom end and a front end. It is illustrated that the front end is in a high wear area approximate a foot rest and thereby subjected to wear of a boot from the rider. As such, the transparent cover plate at least covers the front end preventing wear to the decal from the boot of the rider. As a result, the transparent cover plate may only partially cover the side number plate and only be attached with one of the two bolts indicated. As a result, and even with the best transparent plastic material, some clouding of an image is possible. With the present embodiment, only the front high-wear part of the decal would be subjected to coverage with the transparent cover plate as it is shown that the cover plate includes a terminating edge 58 that stops short of the rear end of the number plate. In this manner, the remainder of the decal which may not be subject to such high wear is more visible and maintains the overall aesthetics of the vehicle.

Figure 3:
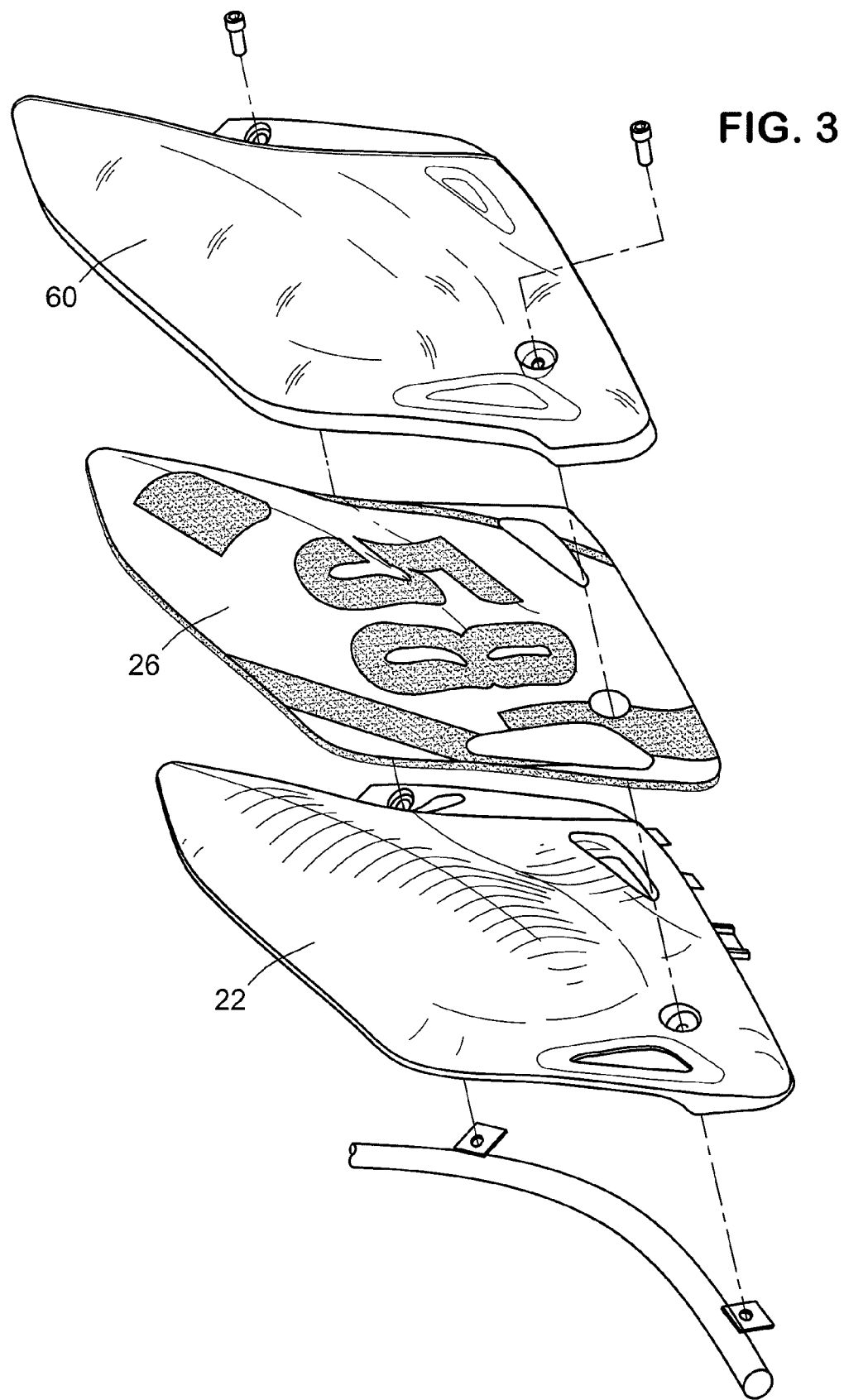
FIG. 3 is an exploded assembly view similar to FIG. 2, but showing an alternative embodiment of a transparent cover plate that fully covers the underlying decal base plate.
Figure 4:
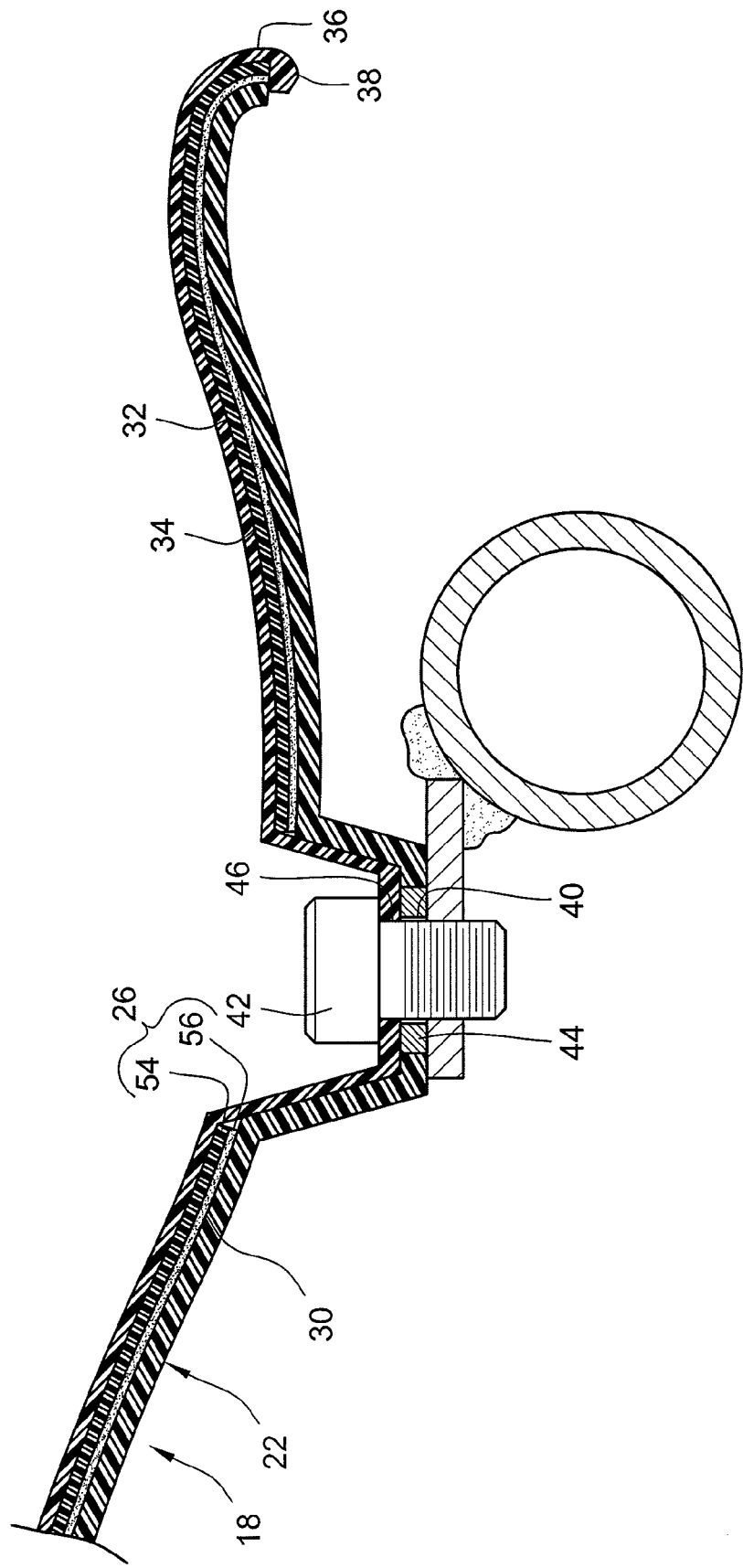
FIG. 4 is a cross section of the decal plate assembly.

Alternatively, as shown in the alternative embodiment of FIG. 3, the cover plate may be a full cover plate 60 that is adapted to cover the entire underlying number plate 22. This full cover plate 60 may have a complete surrounding sidewall that is adapted to cover the entire periphery of the underlying number plate.

In addition to bolt-on attachment, yet another means for attachment of the cover plate to the underlying base plate is by means of adhesive attachment in that an adhesive may be used in a portion or, if it is sufficiently transparent over the contoured surface, to facilitate attachment of the cover plate to the number plate. However, this may be permanent and thereby not allow for readily replacement of the underlying decal. Adhesive attachment may be useful for facilitating cover plates in other regions. For example, transparent cover plates may be employed in other high wear regions such as the air box plate 64 and bottom plate 66 which is along the bottom side of the frame and facing the front wheel. Other attachment areas may be better suited for adhesive attachment. In any event, the embodiments described above protect at least a portion of the decal with a transparent cover plate and facilitate mounting of the transparent cover plate to the motocross motorcycle.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A decal plate assembly for a vehicle, comprising:
a base plate configured for mounting to the vehicle;
a transparent cover plate at least partially covering at least a portion of the base plate; and
a decal having indicia thereon, the decal interposed between the base plate and the transparent cover plate; wherein the decal is an adhesive label adhesively attached to the base plate;
wherein the base plate and the transparent cover plate are molded plastic plates sharing a common contoured shape such that contours on the base plate and cover plate cause the plates to mate in substantially complete surface-to-surface contact, the contoured shape sized and configured to cover a portion of a motocross motorcycle;
wherein the base plate is a side number plate for the motocross motorcycle, the decal having numerical indicia thereon indicative of a rider of the motocross motorcycle, the side number plate having a top end, a rear end, a bottom end and a front end; the front end being located in a high wear area proximate a foot rest area and subject to wear from a boot of the rider, the transparent cover plate at least covering the front end preventing wear to the decal from the boot of the rider;
wherein the cover plate only partially covers the side number plate.

2. The decal plate assembly of claim 1, further comprising at least one bolt hole formed through the side number plate, and at least one aligned bolt hole formed through the cover plate.

3. The decal plate assembly of claim 2, wherein the at least one bolt hole has a metal reinforcement ring molded into the base plate.

4. The decal plate assembly of claim 1, wherein the cover plate is removable from the base plate allowing replacement of the decal.

5. The decal plate assembly 1, further comprising at least one bolt securing the base plate and the cover plate, the at least one bolt securing the base plate and the cover plate to vehicle.

6. The decal plate assembly of claim 1, further comprising adhesive attachment between the base plate and the cover plate.

7. The decal plate assembly of claim 1, further comprising means for attaching the base plate and the cover plate.

8. An apparatus for protecting a decal that is disposed on a decal plate, the decal plate being contoured with a contoured surface to conform dimensions of a motocross motorcycle, the apparatus comprising:
a transparent cover plate molded of plastic material, the transparent cover plate sized and configured to at least partially cover the decal, the transparent cover plate having a contoured plate body substantially matching the contoured surface of the decal plate such that the transparent cover plate is adapted to mate in substantial surface-to-surface relation with the decal plate; and
wherein the cover plate is sized substantially smaller than the decal plate adapted to cover only a portion of the decal plate.

9. The apparatus of claim 8, wherein the cover plate includes a sidewall depending from the contoured plate body adapted to closely surround a periphery of the decal plate.

10. The apparatus of claim 8, wherein the cover plate includes a bolt hole extending through the countered plate body adapted to align with a corresponding bolt hole in the decal plate.

11. The apparatus of claim 8, further comprising means for attaching the transparent cover plate to the decal plate.

* * * * *